United States Patent
Snyder

(10) Patent No.: US 6,568,095 B2
(45) Date of Patent: May 27, 2003

(54) MAGNETIC TORPEDO LEVEL

(76) Inventor: David H. Snyder, Rd. #2, Box 384 A, Portage, PA (US) 15946

(*) Notice: Subject to any disclaimer, the term of this patent is extended or adjusted under 35 U.S.C. 154(b) by 0 days.

(21) Appl. No.: 09/897,126

(22) Filed: Jul. 3, 2001

(65) Prior Publication Data

US 2003/0005590 A1 Jan. 9, 2003

(51) Int. Cl.$^7$ ................................. G01C 9/28
(52) U.S. Cl. ..................... 33/370; 33/382; 33/DIG. 1
(58) Field of Search ................. 33/370, 347, 365, 33/371, 374, 375, 379, 382, 383, 384, DIG. 1

(56) References Cited

U.S. PATENT DOCUMENTS

| | | | |
|---|---|---|---|
| 1,617,937 A | 2/1927 | Boucher et al. | |
| 2,535,791 A | 12/1950 | Fluke | |
| 2,541,880 A | * 2/1951 | McMillan et al. | ............ 33/347 |
| 2,553,668 A | 5/1951 | Morello | |
| 2,695,949 A | 11/1954 | Ashwill | |
| 2,708,317 A | * 5/1955 | Warne | ........................ 33/347 |
| 2,789,363 A | 4/1957 | Miley | |
| 3,046,672 A | 7/1962 | Lace | |
| 3,103,749 A | 9/1963 | Dillemuth | |
| 3,180,035 A | 4/1965 | Olexson et al. | |
| 3,180,036 A | 4/1965 | Meeks, Sr. | |
| 3,213,545 A | 10/1965 | Wright | |
| 3,499,225 A | 3/1970 | Darrah | |
| 3,820,249 A | 6/1974 | Stone | |
| 4,593,475 A | 6/1986 | Mayes | |
| 4,996,777 A | * 3/1991 | Grosz | .......................... 33/384 |
| 5,531,031 A | * 7/1996 | Green | ......................... 33/365 |
| 5,535,523 A | 7/1996 | Endris | |
| 6,173,502 B1 | 1/2001 | Scarborough | |
| 6,332,277 B1 | * 12/2001 | Owoc et al. | .................. 33/374 |

FOREIGN PATENT DOCUMENTS

GB         1259531         1/1972

* cited by examiner

Primary Examiner—Christopher W. Fulton
(74) Attorney, Agent, or Firm—Richard C. Litman

(57) ABSTRACT

A magnetic torpedo level is adapted for removable magnetic attachment to pipes, EMT (electrical metal tubing), and other ferrometallic cylindrical objects, for measuring their level or slope. The present level includes a series of laterally placed magnets across its base edge, with a pair of ferrometallic rails capturing the magnets therebetween. Ceramic magnets are preferred for their power and longevity, but other magnets may be used as desired. The rails depend beyond the magnets, and define a channel for seating securely upon a cylindrical surface. At least one of the level vials of the present level is may be adjustably repositioned within its vial frame, in one of a series of pairs of vial passages, to adjust the angle of the vial to a specific predetermined angle relative to the level body as desired.

20 Claims, 4 Drawing Sheets

MAGNETIC TORPEDO LEVEL

BACKGROUND OF THE INVENTION

1. Field of the Invention

The present invention relates generally to measuring tools and devices, and more particularly to a small, "torpedo" type spirit level having magnetic means for temporarily securing the level to a ferrometallic structure and further means for adjustably positioning at least one level vial therein. The present magnetic torpedo level is particularly well suited for use in the electrical and plumbing fields, where ferrometallic pipe or EMT (electrical metal tubing) is used and bends to predetermined angles are placed in such pipe or tubing.

2. Description of the Related Art

Small, "torpedo" type spirit levels are popular measuring tools for people working in a number of different technical fields. Such levels are quite suitable for measuring bend angles in pipes and other similar functions, where it is not necessary to establish an absolutely precise horizontal or vertical line (e.g., building wall construction, etc.). Torpedo levels provide additional utility in that they are also easily stored within a relatively small space in a toolbox or the like, and do not require a large amount of storage space in the tool kit of the journeyman worker.

As many such levels are used in measuring the level or angle of pipe runs and EMT lines and the like, various variations of magnetic attachment means for such torpedo levels have been developed in the past. These various magnetic attachment means have fallen short of the magnetic attachment means of the present magnetic torpedo level, in that they have failed to provide sufficient magnetic attraction to hold the level securely in place during pipe and tube bending operations. The various magnetic levels of the prior art also differ from the present invention in various structural aspects, as well.

Another critical point particularly in the electrical and plumbing fields, is the need to bend tubing and pipe to certain predetermined angles in the field. Pipe and tubing is commonly bent to bisect a vertical quadrant, i.e., to form a 45 degree angle between the horizontal and vertical, with that 45 degree angle being further bisected to form a 22.5 degree bend angle in many cases. Yet, most levels contain level vials immovably affixed in place only parallel and perpendicular to the major axis of the level, with only a very few levels including even a 45 degree angle. None of the levels known to the present inventor include a level vial set at a 22.5 degree angle to the major axis of the level, and further, none of those known levels include any means of precisely adjusting the angular position of any of their vials to broaden the utility of the level.

Accordingly, a need will be seen for a magnetic torpedo level including novel magnetic means for temporarily attaching the level to a ferromagnetic structure, to provide a secure grip for the level until it is removed by the user. Moreover, the present magnetic torpedo level includes at least one angularly adjustable level vial therein, allowing the adjustable level vial to be precisely positioned as desired to certain predetermined angles as established by the vial holding fixture or frame within the level.

A discussion of the related art of which the present inventor is aware, and its differences and distinctions from the present invention, is provided below.

U.S. Pat. No. 1,617,937 issued on Feb. 15, 1927 to George F. Boucher et al., titled "Illuminated Level," describes a level having a pair of magnets removably installed in depressions in one side thereof. An elevation view in section clearly shows the magnets to be flush with the surface of the level, unlike the present magnetic level. The Boucher et al. level cannot provide a secure grip to a cylindrical metal object, such as a pipe or tube, due to its flat, nonconforming magnetically attractive side. In contrast, the present magnetic torpedo level includes a pair of laterally opposed, spaced apart ferrometallic rails extending from one side of the level, with a series of magnets imbedded in the surface of the level and contacting the two rails. The space between the rails provides clearance for the convex surface of the cylindrical ferrometallic pipe or tube to which the present level is temporarily magnetically secured.

U.S. Pat. No. 2,535,791 issued on Dec. 26, 1950 to Rothwell R. Fluke, titled "Level With Magnetic Securing Means," describes two embodiments of magnetic levels. One embodiment includes two bar magnets extending through the thickness or height of the level, while the other embodiment includes a pair of semicircular or "horseshoe" magnets with their poles disposed to the edge of the level. Each embodiment includes a groove formed along the magnetically attractive edge, with the magnet ends conforming to the groove, in order to fit along a cylindrical object (metal pipe, tube, etc.) more closely. The Fluke level thus requires that the magnets be specially shaped to conform to such cylindrical shapes, while the present invention utilizes conventionally shaped magnets which communicate magnetically with spaced apart metal rails extending outwardly to each side thereof. Moreover, Fluke does not disclose any means of adjusting the angle of any of the level vials of his level, whereas the present level includes such angular vial adjustment for at least one level vial.

U.S. Pat. No. 2,553,668 issued on May 22, 1951 to Michael Morello, titled "Level Magnetic Attachment," describes magnets which are removably attachable to a level by means of clips. The Morello level itself does not have any magnetic properties, whereas the present level includes permanently installed magnetic means.) As in the other levels discussed herein, Morello does not provide any means for adjusting the angle of any of the level vials of his level, unlike the present level with its at least one angularly adjustable level vial.

U.S. Pat. No. 2,695,949 issued on Nov. 30, 1954 to James H. Ashwill, titled "Illuminated Spirit Level," describes a level having fixed horizontal, vertical, and 45 degree angle vials therein. Ashwill does not provide any means for adjusting the angle of any of the vials of his level after manufacture of the level. The bottom of the Ashwill level is provided with a magnetic plate at each end thereof, but the plates are flat on the bottom, as is the rest of the level. Ashwill does not provide any depending longitudinal rails or the like to allow his level to seat securely upon a cylindrical surface, as provided by the present magnetic torpedo level.

U.S. Pat. No. 2,789,363 issued on Apr. 23, 1957 to George E. Miley, titled "Magnetic Level," describes two different embodiments of a level having magnetic means for temporarily securing it to a ferrous metal surface. The first embodiment includes a longitudinal groove along one surface, with a series of separate magnets mounted flush with the grooved surface and having corresponding grooves thereacross. The groove allows the Miley level to fit closely to a cylindrical surface. However, Miley does not provide any continuous ferrous metal rails to magnetically connect his magnets, as provided in the present invention. No angularly adjustable level vials are provided by Miley for either of the embodiments of his level, whereas the present magnetic torpedo level invention includes such angularly adjustable level vials.

U.S. Pat. No. 3,046,672 issued on Jul. 31, 1962 to Harry S. Lace, titled "Level," describes a spirit level having illumination and magnetic means. The magnetic means comprises a pair of ceramic magnets which are each sandwiched between a pair of ferrometallic plates which extend slightly beyond the outer edge of the magnets, to define a channel or groove therebetween. A corresponding groove is formed along the length of the level body, to allow the level to seat on a cylindrical surface. The magnet assemblies are retractably mounted within the level body, and extend automatically due to magnetic attraction when the level is placed upon a ferrometallic surface. However, Lace does not provide continuous ferrometallic rails to define the channel for seating his level on another ferrometallic cylindrical object, nor does he provide any means for adjusting the position(s) of his level vial(s).

U.S. Pat. No. 3,103,749 issued on Sep. 17, 1963 to Arnold H. Dillemuth, titled "Level," describes a level with one side having a shallow groove therein, with an elongate strip magnet disposed to each side of the center of the groove. Dillemuth also provides an arcuately pivoted arm extending from the center of his level, with a pair of mutually orthogonal level vials installed therein. The arm is adapted to swing downwardly due to gravity, but due to its pivot axis, the Dillemuth level must remain in the vertical plane to allow the pivot arm to function as intended. Dillemuth does not provide a series of longitudinally spaced magnets nor any means of adjustably positioning a level vial within its holding frame, as provided by the present level invention.

U.S. Pat. No. 3,180,035 issued on Apr. 27, 1965 to Andrew S. Olexson et al., titled "Piggyback Pocket Level," describes a level having a removable level vial assembly, comprising horizontal and/or vertically oriented vials. The vials are disposed along the edge(s) of a generally rectangular magnetic structure, which may be removed from the level body and magnetically secured to a ferrometallic structure. The magnetic structure of the level vial assembly includes a pair of plates sandwiching a magnet therebetween, with the plate edges extending slightly beyond the magnet to define a channel for securing to a cylindrical object. However, Olexson et al. do not provide continuous magnetic strips along the entire length of their level body, nor do they provide any means of angularly adjusting the position(s) of the level vial(s) in their level body, as provided in the present invention.

U.S. Pat. No. 3,180,036 issued on Apr. 27, 1965 to James E. Meeks, Sr., titled "Galvanized Bead Setter," describes a level adapted for use along relatively narrow corner beads having relatively small radii. The Meeks, Sr. level includes a series of magnets along one side or edge thereof, but the rails extending along the level for retaining the magnets and defining the bead grove, are not formed of ferromagnetic material and cannot assist in the magnetic attachment of the Meeks, Sr. level to a ferromagnetic object, as provided by the present level invention. Moreover, Meeks, Sr. does not provide any means of angularly adjusting the position(s) of his level vial(s) within his level, as provided by the present magnetic torpedo level invention.

U.S. Pat. No. 3,213,545 issued on Oct. 26, 1965 to Donald E. Wright, titled "Level With Magnetic Working Surface," describes a level having a series of abutting magnets installed within a closely fitting channel formed along one side or edge of the level body. The outer surfaces of the magnets are flush with the edges of the level body, with no channel being provided for assisting in securing the Wright level to a cylindrical surface, as provided by the present magnetic torpedo level. Also, while Wright provides a "keeper" strip of ferrometallic material beneath his magnets, he does not provide a separate ferrometallic strip along each pole of the magnets, as provided in the present magnetic level invention. The spaced apart ferrometallic strips of the present level provide a dual function, in that they serve as rails defining a channel therebetween for holding the level to a cylindrical metal object, and also provide a "keeper" function for preserving the strength of the magnets therebetween. No adjustably positionable level vials are provided by Wright in his level.

U.S. Pat. No. 3,499,225 issued on Mar. 10, 1970 to Percy A. Darrah, titled "Magnetically Attached Ironworker Tool," describes a square with two opposed, elongate magnets installed along one leg thereof, sandwiching the leg between the magnets. This construction is opposite that of the present level, with its magnets captured between a pair of ferrometallic strips which define a channel therebetween. Also, while Darrah provides level vials in the face of one of the magnets, he does not provide any means of adjusting the angle of the level vials.

U.S. Pat. No. 3,820,249 issued on Jun. 28, 1974 to Theodore M. Stone, titled "Self-Gripping Level," describes a level assembly comprising two L-section plates hinged together along their longer legs, so the longer legs abut one another when the device is folded. The areas immediately adjacent the angles of the legs include elongate magnetic strips permanently installed therealong. A series of level vials are provided in one of the plates, with a corresponding series of windows formed in the opposite plate for viewing the vials from that side. The hinges permit the device to be placed upon various diameters of pipe or tube as desired. While Stone recognizes the need to provide a channel to fit a cylindrical pipe or the like, he does so by means of opening the hinged surfaces of his assembly, rather than providing a permanent channel along one side or edge of a solid level body. Moreover, Stone does not provide any means of adjusting the position of his level vials.

U.S. Pat. No. 4,593,475 issued on Jun. 10, 1986 to Daniel J. Mayes, titled "Level With Slotted Magnet Support," describes a level in which one edge is provided with a flexible or rubberized magnetic strip. A channel or slot is formed along that side, with the magnetic strip conforming to the channel. In contrast, the present magnetic level uses a series of magnets disposed across the base edge of the level to magnetize a pair of spaced apart rails, which results in a much stronger magnetic attraction than that provided by flexible magnetic strip material. Also, the Mayes level does not provide any means for angularly adjusting the level vials, as provided by the present magnetic torpedo level invention.

U.S. Pat. No. 5,535,523 issued on Jul. 16, 1996 to Matthew K. Endris, titled "Carpenter's Square," describes a square having magnetic means along the two normal inner edges thereof. No groove or channel is provided, as the device is intended for use across metal building stud construction, rather than for determining the level or angle of pipe or tube runs, or bending such pipe or tube. As such, the Endris square more closely resembles the square of the Darrah '225 U.S. Patent, discussed further above, than the present magnetic torpedo level invention. Moreover, Endris does not provide any means for angularly adjusting the position(s) of any of his level vials, whereas such means is provided in the present magnetic level invention.

U.S. Pat. No. 6,173,502 issued on Jan. 16, 2001 to Dane Scarborough, titled "Magnetically Engageable Level Sensing Apparatus And Standoff," describes a level assembly in which two magnetic standoffs are separably attachable to the level body. As two separate and relatively short standoffs are provided, the bars or rails and the magnets captured therebetween are relatively short, and do not extend essentially the entire length of the level body, as provided by the present invention. Moreover, Scarborough is silent regarding any means of angularly adjusting the position(s) of any of the level vials of his level assembly, whereas the present magnetic torpedo level includes such angular level vial adjustment means.

Finally, British Patent Publication No. 1,259,531 published on Jan. 15, 1972 to Quenot & Cie, titled "Improved Spirit Level Device," describes a device formed by securing two levels together, with their major widths disposed normal to one another to define an L-section. The thicknesses of the two levels defines a channel along their adjacent minor thicknesses, in which a series of magnets are installed to each side of the channel; the magnets do not extend across the channel, as they do in the present invention. No metal rails are provided, as the thicknesses of the levels defines an angular channel therebetween. While a series of level vials is provided, none have any means for angular adjustment to set different angles therein, as provided by the present invention.

None of the above inventions and patents, taken either singularly or in combination, is seen to describe the instant invention as claimed.

SUMMARY OF THE INVENTION

The present invention is a magnetic torpedo level, adapted particularly for use in measuring and defining certain predetermined angles in the fabrication, bending and installation of pipe, electrical metal tubing (EMT), and similar elongate cylindrical components. The present magnetic spirit level includes a series of magnets with their poles aligned across the thickness of the level body, with ferrometallic rail disposed to each side or end of the magnets and capturing the magnets therebetween. The rails provide continuous magnetic attraction along their lengths.

The two rails extend slightly outwardly from the base edge of the level body, thereby defining a channel therebetween. This channel is adapted to fit securely along the convex curvature of a cylindrical pipe or other similarly shaped object. The present magnetic level provides extremely strong holding and retaining power when placed upon a length of ferrometallic pipe, tube, or other similar material.

The present magnetic torpedo level also includes at least one angularly adjustable level vial therein. At least one of the vial frames includes a plurality of different vial sockets therein, and is removable from its placement within the level body. The various vial sockets are arranged in pairs, with each socket of a given pair disposed opposite one another. The sockets may define vial angles parallel or perpendicular to the length of the level body, or at some other angle thereto, e.g., 45 degrees or 22.5 degrees. The user of the present level may remove the vial frame, remove the vial tube from whichever pair of vial sockets in which it has been installed, replace the vial tube in the desired sockets which define the desired angle, and replace the vial frame in the level body.

Accordingly, it is a principal object of the invention to provide a magnetic torpedo level, configured for temporary magnetic attachment to a cylindrical ferrometallic pipe, tube, or the like, for measuring the level or slope thereof.

It is another object of the invention to provide a magnetic torpedo level which cylindrical attachment configuration comprises a series of transverse magnets captured between a pair of ferrometallic rails, with the rails extending below the magnets to define a channel therebetween.

It is a further object of the invention to provide a magnetic torpedo level having means for adjustably positioning at least one level vial to one of a predetermined series of angles as desired.

It is an object of the invention to provide improved elements and arrangements thereof for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a magnetic torpedo level particularly adapted for use in determining the level or slope of cylindrical ferrometallic components (e.g., steel pipe, electrical metal tubing or EMT, etc.). The present level includes means for seating securely and accurately along such a pipe or tube and conforming to the cylindrical curvature of the pipe or tube, and also for attaching securely but temporarily and removably to the pipe or tube due to its magnetic attachment means. The present level also includes means for accurately adjusting the slope or angle of at least one of the level vials therein to a predetermined angle relative to the level body, as desired.

Figure 1:
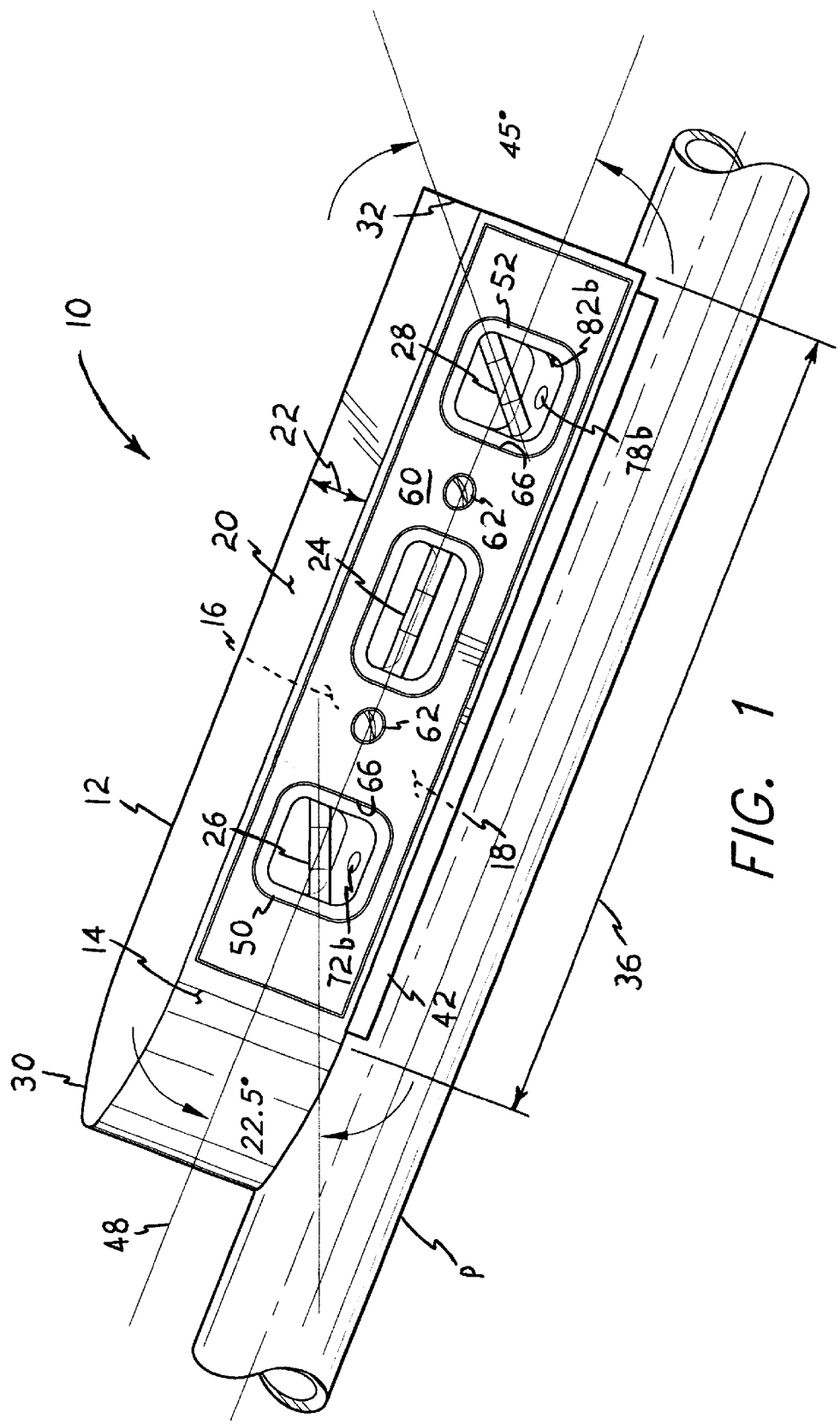
FIG. 1 is an environmental, perspective view of a magnetic torpedo level according to the present invention.

FIG. 1 provides an environmental perspective view of the present magnetic torpedo level 10, illustrating its general features. The level 10 includes a generally rectangular level body 12, with the body 12 having opposite first and second side faces, respectively 14 and 16, and opposite base and top edges, respectively 18 and 20 normal to the side faces 14 and 16. The two side faces 14 and 16 define the thickness 22 of the level body 12, which provides room for the inclusion of one or more level vials 24, 26, and/or 28 therein. The level body 12 further has a tapered first end 30, as is found in some torpedo levels, but the opposite second end 32 is squared off, as in a conventional construction level. This combination of a tapered end 30 and squared end 32, provides certain benefits in handling, manipulation, and use of the present magnetic torpedo level 10, not found in other levels.

Figure 2:
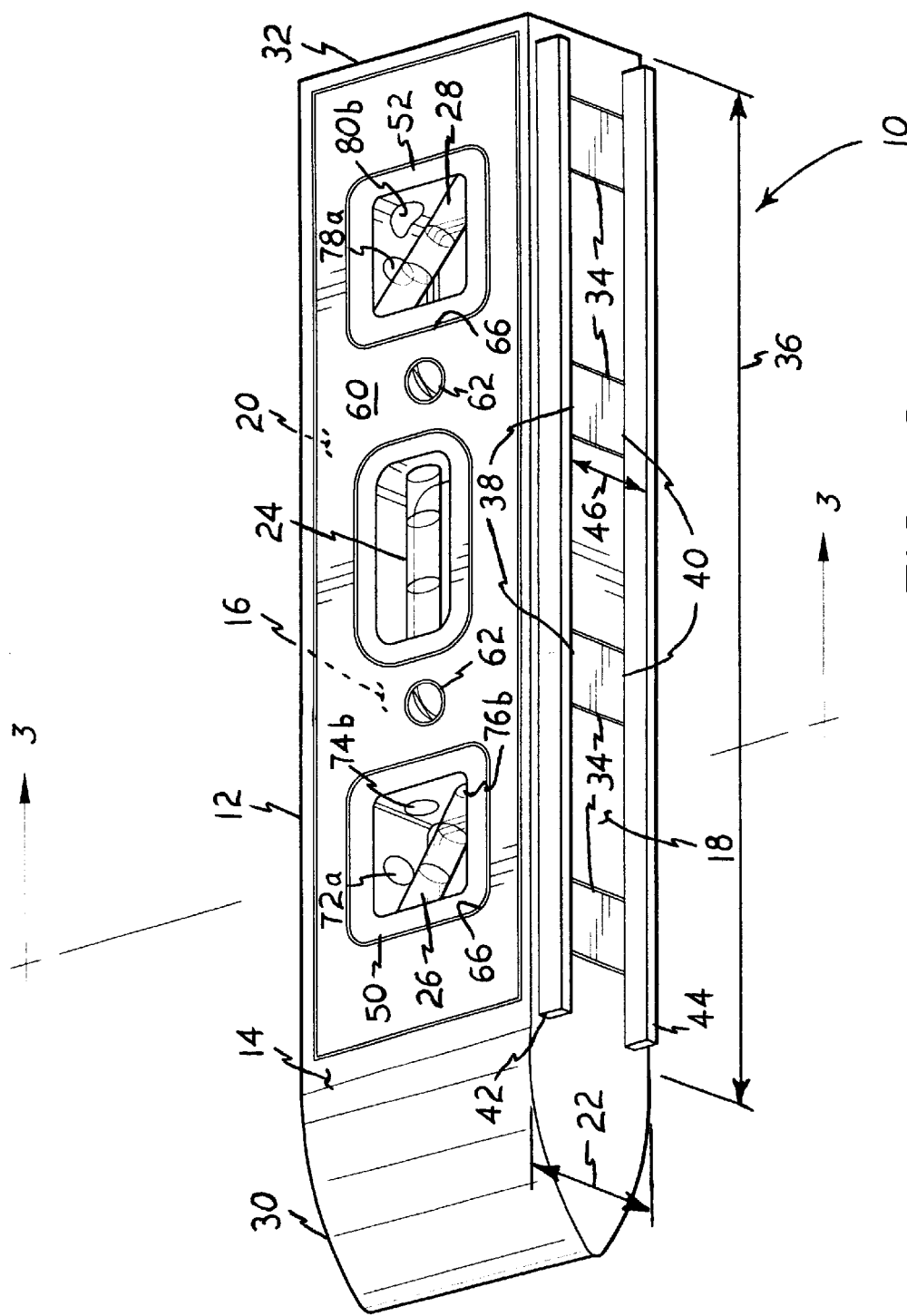
FIG. 2 is a bottom and side perspective view of the present magnetic torpedo level, showing its magnetic attachment structure.
Figure 3:
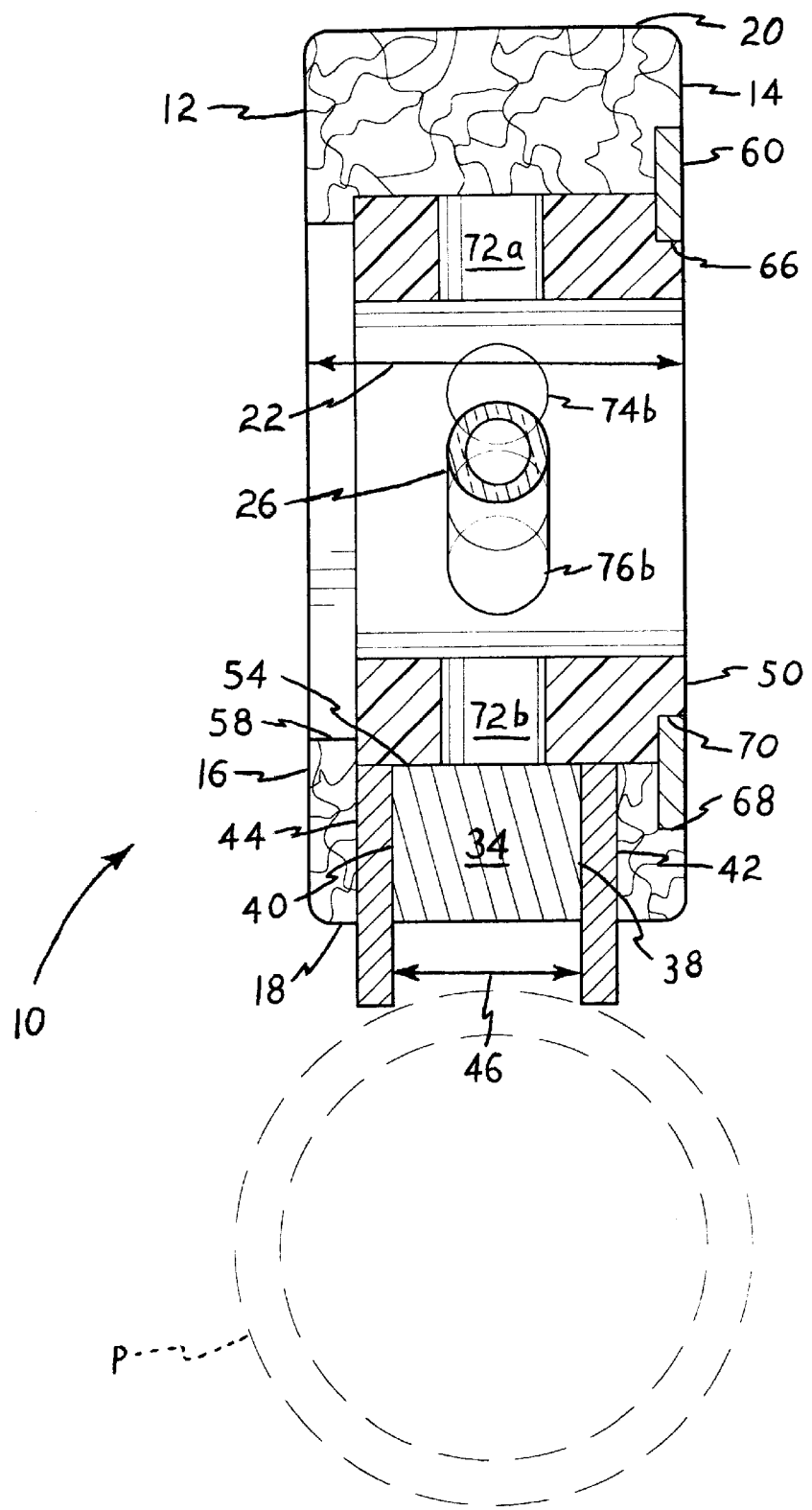
FIG. 3 is an elevation view in section along line 3—3 of FIG. 2, showing further structural details.
Figure 4:
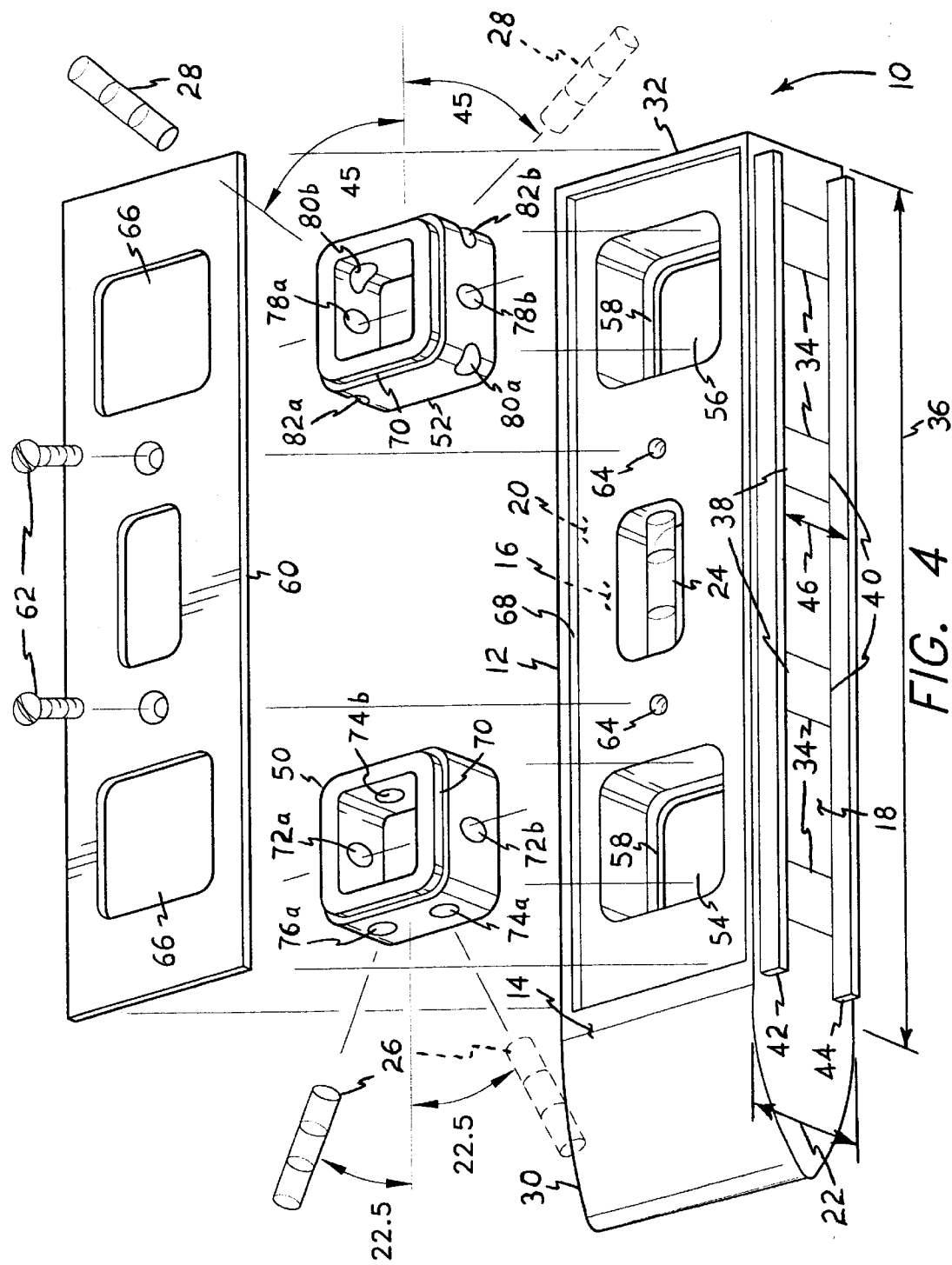
FIG. 4 is an exploded perspective view of the present magnetic torpedo level, showing further details thereof.

The base 18 of the level body 12 includes a plurality of magnets 34 integrated permanently and immovably affixed therewithin, as shown clearly in FIGS. 2, 3, and 4 of the drawings. The magnets 34 are preferably ceramic permanent magnets, selected due to their relatively high magnetic strength for their size and the relatively low dissipation of their magnetic force over time. However, other types of magnets, e.g., conventional alnico magnets, etc., may be used if so desired. The magnets 34 are spaced apart longitudinally along the major length 36 of the level body 12, i.e., the length of the rectangular portion of the body 12 short of the tapered first end portion 30.

The magnets 34 are preferably oriented with their magnetic poles aligned transversely to the length 36 of the level body 12, with their first pole ends 38 adjacent the first side face 14 of the level body 12 and their opposite second pole ends 40 adjacent the second side face 16 of the level body 12. A first and a second rail, respectively 42 and 44 each comprising a straight, continuous length of ferrometallic material (e.g., steel, etc.), is permanently affixed and integrated with the level body 12 and in contact with the respective first and second poles 38 and 40 of the magnets 34 to capture the magnets 34 therebetween. The two rails 42 and 44 are parallel to one another, with their extended depending edges also being parallel for accurate placement of the level 10 along a cylindrical object (e.g., ferrometallic pipe P, as shown in FIGS. 1 and 3, electrical metal tubing, etc.).

These rails 42 and 44 extend substantially the major length 36 of the level body 12, and provide four functions: (1) they provide straight, parallel edges for seating the level 10 upon a straight object; (2) they depend below the magnets 34 and base edge 18 of the level body 12, and define a channel 46 therebetween for seating upon a cylindrical body; (3) they are permeated by the magnetic fields of the magnets 34, to form extended magnetically active or attractive first and second poles for magnetically attaching to another ferrometallic object; and (4) they serve as "keepers" for the magnets 34, providing a magnetically permeable path for the magnetic fields, thereby assisting the magnets 34 to retain their magnetism for a longer period of time.

The level body 12 includes at least one level vial therein, and preferably includes a series of such level vials affixed therein at different angles to the longitudinal axis 48 (shown in FIG. 1) of the level body 12 and the two rails 42 and 44, parallel to the level body longitudinal axis 48. Preferably, one or more of the level vials, e.g., the second and third vials 26 and 28, are angularly adjustable to two or more predetermined specific angles relative to the longitudinal axis 48 and the parallel rails 42 and 44. This is achieved by providing removable level vial frames, respectively 50 and 52, for the second and third vials 26 and 28. The vial or vials 26 and/or 28 may in turn be adjustably placed within one set of a series of sets of vial passages in the frame or frames, according go the angle desired between the longitudinal axis 48 and rails 42 and 44 of the level body and the level vial(s)

FIG. 4 provides an exploded perspective view which clearly shows this structure. In FIG. 4, the second and third level vials 26 and 28 are removed from their respective level vial frames 50 and 52, with the vial frames 50 and 52 in turn being removed from their respective vial frame passages 54 and 56 which extend completely through the thickness 22 of the level body 12. An inwardly extending ridge or lip 58 may be provided on the second side face 16 of the level body 12, about each vial frame passage 54 and 56, to preclude passage of the vial frames 50 and 52 completely through the level body 12 when inserted therein from the first side face 14 of the level body 12. It will be seen that the vial frame passages 54 and 56, and their respective vial frames 50 and 52 which fit closely therein, are formed with generally square peripheries. Other non-circular shapes may be used as desired, so long as the complementary shapes do not allow rotation of the vial frames 50 and 52 within their respective passages 54 and 56.

A vial frame retainer plate 60 is removably secured over the first side face 14 of the level body 12, to retain the two removable vial frames 50 and 52 in their respective passages 54 and 56 as desired. One or more screws 62 which engage mating screw holes 64 formed in the level body 12, may be used to secure the retaining plate 60 in place on the level body 12 as desired. The plate 60 includes a series of vial viewing windows therein, with the windows 66 for the two removable vial frames 50 and 52 being slightly smaller than the frames 50 and 52, in order to retain the frames 50 and 52 within their respective passages 54 and 56.

The vial frame retainer plate 60 is preferably set flush or level with the outer surface of the first face 14 of the level body 12, in order to provide an aesthetically pleasing finish for the assembly and to preclude edges which might snag upon an article or collect dirt or other foreign matter. Accordingly, the outer periphery of the plate 60 is slightly smaller than the flat portion of the first face 14, with the first face 14 having a raised periphery 68 therearound into which the plate 60 fits closely. Each of the removable vial frames 50 and 52 has a periphery slightly larger than the retainer plate windows 66, with a relief or groove 70 formed about the outer edge of each frame 50 and 52 to fit within their respective retainer plate windows 66. The flush fit of this assembly is shown clearly in the elevation view in section of FIG. 3 of the drawings.

The two vial frames 50 and 52 are each provided with a number of vial receptacle or socket sets, with each set comprising a first and a second socket diametrically opposed to one another and forming a vial socket pair. Each of the sockets extends completely through the side wall of its respective vial frame, as shown clearly in FIGS. 3 and 4 of the drawings. This allows the vials 26 and/or 28 to be removed from one set or pair of sockets and inserted into another set or pair, depending upon the vial angle desired, by sliding the vial outwardly from one vial socket set and inserting it through the vial frame side wall into the second socket set.

FIG. 4 of the drawings provides an exemplary illustration of such multiple vial socket pairs or sets having different angles relative to the level body 12 and rails 42 and 44 when the vial frames 50 and 52 are installed within the level body 12. The first removable vial frame 50 contains three sets or pairs of vial socket passages, designated as passages 72a and b, 74a and b, and 76a (with 76b not being visible due to the angle of the perspective).

The first vial socket pair, comprising first and second passages 72a and 72b, is formed vertically through the vial frame 50, i.e., normal to the fixed first vial 24 and the horizontal axis 48 (shown in FIG. 1) of the level body 12 and the rails 42 and 44. The level vial 26 may be used to check vertical alignment of pipes, tubes and the like when the level body 12 is placed therealong, when the vial 26 is installed within the vial socket pair comprising first and second vial sockets 72a and 72b.

Second and third vial socket pairs, comprising vial socket sets 74a, b and 76a, b (76b being visible in FIGS. 2 and 3), are each oriented at 22.5 degrees from the longitudinal axis 48 and rails 42 and 44 of the level body 12. The vial socket pair 74a and b positions the vial 26 so the vial bubble is level with the tapered first end 30 of the level body angled upwardly 22.5 degrees above the horizontal relative to the level body second end 32, as shown in FIG. 1 of the drawings. The vial socket pair 76a and b are essentially opposite the pair 74a and b, and level the bubble of the vial 26 when the first end 30 of the level body 12 is angled 22.5 degrees downwardly relative to its opposite second end 32.

It will be seen that the first vial frame 50 provides further versatility for the present magnetic level 10, in that the square shape of the frame 50 and its closely fitting passage 54 allow the vial frame 50 to be oriented 90 degrees to the orientation illustrated in the drawing Figures. When this is done, the vial socket set 72a and b is aligned parallel to the longitudinal axis 48 of the level body 12, or parallel to the fixed first level vial 24. The second and third vial socket sets 74a, b and 76a, b are oriented at 22.5 degrees to either side of an axis normal to the longitudinal axis 48 of the level body 12. Thus, a total of six different vial angles or orientations may be provided with the three different vial socket sets of the first vial frame 50, depending upon its orientation within its vial frame passage 54.

The second vial frame 52 includes a series of vial socket sets having different angular orientations than those of the first vial frame 50. The second vial frame 52 includes a first vial socket set comprising vial sockets 78a and b oriented normal to the longitudinal axis 48 of the level body 12 when the vial frame 52 is installed in its frame passage 56 as illustrated in the drawing Figures. However, it will be seen that the square shape of the frame 52 and its passage 56 permits the frame 52 to be installed at 90 degrees to the orientation illustrated, if so desired, to position this first vial socket set of sockets 78a and b parallel to the horizontal axis 48 of the level body 12, if so desired, in the manner of the optional repositioning of the first vial frame 50 described further above.

The second and third vial socket sets or pairs of the second removable vial frame 52 are oriented diagonally across the vial frame 52, with the second set comprising vial sockets 80a and b providing a level vial bubble when the level body 12 is positioned with its first end 30 raised 45 degrees above its opposite second end 32. The third set of vial sockets comprising sockets 82a and b is oriented perpendicularly to the second set of sockets 80a and b, thus positioning a vial 28 installed therein horizontally when the first end 30 of the level body 12 is oriented at an angle 45 degrees below the opposite second end 30. It will be seen that when the second vial frame 52 has a shape allowing it to be repositioned at 90 degrees to the orientation shown in the drawing Figures, that the vial orientation provided by the two diagonal vial socket sets 80a, b and 82a, b is reversed. In fact, only a single diagonal vial socket set need be provided in such a square vial frame 52, as it may be reoriented by 90 degrees if so desired.

The present magnetic level 10 is particularly valuable to the electrician who has occasion to bend electrical metal tubing (EMT) to bisect a 90 degree quadrant (i. e., form an angle of 45 degrees) or further to bisect the resulting 45 degree angle (i.e., form an angle of 22.5 degrees). However, it will be seen that the vial frames 50 and 52 may be formed with vial socket pairs or sets defining any practicable angle as desired, e.g., 5, 10, 12, 15, 30, 40, or other degree angles as desired. In fact, a series of different vial frames may be provided with the present level 10, or as an accessory thereto, to provide a wide variety of vial angles.

The present level is easily adjusted as desired, by removing the vial frame retainer plate 60 and pushing the selected vial frame from its respective passage in the level body 12. As the vial frame passages 54 and 56 extend completely through the level body 12, the user of the level may push the selected vial frame from the second side face 16 of the level, outwardly through the opposite face 14 to remove the selected frame. The corresponding vial contained in that vial frame is then removed by pushing it out of its vial socket set, and reinserted in the vial socket set which is oriented to provide the desired vial angle. The vial frame is then reinserted in its vial frame passage, and the retaining plate 60 is reattached by means of the screws 64 to complete the assembly. Alternatively, the selected vial frame may be merely reoriented by 90 degrees within its vial frame passage, when square vial frames and passages are provided, or an auxiliary vial frame having different vial socket orientations may be used as desired.

Many spirit level vials have a slight curvature, in order to provide incremental positioning of the level bubble over very small angular adjustments of the level. While the present level may make use of either straight or curved vials, such curved vials may be difficult to orient properly upon installation within the vial sockets of a level frame. Accordingly, they may be marked for proper orientation, i.e., with the convex curvature of the vial tube oriented upwardly, or alternatively, the vial tubes may be provided with a slight "barrel," shape having a slightly larger center diameter, in order to avoid orientation problems.

The body of the present level is preferably formed of a nonmagnetic material, such as plastic, aluminum, or wood. Any non-magnetic material having sufficient strength and durability may be used, as desired. The vial frames are preferably formed of a slightly resilient plastic, in order to provide sufficient resilience to grip the walls of their corresponding passages securely, and also to grip the level vials securely which are installed therein. However, the level body 12 and vial frames 50 and 52 are preferably formed of relatively inflexible material, in order to provide the required accuracy for the present level.

In conclusion, the superior magnetic attraction provided by the present level provides much more positive magnetic attachment to ferrometallic pipe, tubing, and other similar materials. The channel defined by the two extended rails to each side of the laterally disposed magnets, serves well for placement upon cylindrical objects and provides precise alignment along their lengths. Also, the adjustably positionable level vials provide much improved versatility over other levels of the related art, allowing the user of the present level to determine or set the slope of a number of predetermined angles or slopes with a single instrument, without requiring a series of specialized levels each having one or more level vials set at different slopes or angles from one another. The present magnetic torpedo level thus serves as a valuable addition to the tool box of the electrician, plumber, or other worker who has occasion to establish a predetermined angle from the horizontal for a run of pipe, tubing, or similar line.

It is to be understood that the present invention is not limited to the embodiment described above, but encompasses any and all embodiments within the scope of the following claims.

I claim:

1. A magnetic torpedo level, comprising:
    a generally rectangular level body having a first side face, a second side face opposite said first side face defining a thickness therebetween, a base edge, a top edge opposite said base edge, opposed first and second ends, and a major length extending therebetween;
    a plurality of longitudinally spaced apart magnets disposed across said base edge and integrated with said level body;
    each of said magnets having a first pole disposed adjacent said first side face and a second pole disposed adjacent said second side face of said level body;
    a first rail contacting said first pole of each of said magnets;

a second rail contacting said second pole of each of said magnets;

each said rail comprising a continuous length of ferrometallic material integrated with said level body and extending substantially along said major length of said level body;

each said rail further being parallel to one another, and depending from said base of said level body beyond said magnets and defining a channel therebetween for seating securely upon a cylindrical object;

at least one level vial frame disposed through said thickness of said level body; and a level vial angularly adjustably disposed across said at least one level vial frame, visible from each of said side faces.

2. The magnetic torpedo level according to claim 1, wherein:

said at least one level vial frame is removably disposed through said thickness of said level body;

said at least one level vial frame further includes a plurality of sets of level vial sockets disposed therein; and each of said sets of level vial sockets comprises a first and a second level vial socket diametrically opposed to one another, for removably accepting said level vial therein and removably holding said level vial across said at least one level vial frame at a predetermined angular orientation relative to said level body according to the one of said sets of level vial sockets selected for removably installing said level vial therein.

3. The magnetic torpedo level according to claim 2, wherein said plurality of sets of level vial sockets of said at least one level vial frame define level vial orientations at 45 degrees, 22.5 degrees, parallel, and perpendicular to each said rail.

4. The magnetic torpedo level according to claim 2, further including a removable retaining plate for removably holding said at least one level vial frame within said level body.

5. The magnetic torpedo level according to claim 1, wherein said magnets comprise ceramic permanent magnets.

6. The magnetic torpedo level according to claim 1, wherein said level body is formed of material selected from the group consisting of plastic, aluminum, and wood.

7. The magnetic torpedo level according to claim 1, wherein said first and second ends of said level body are respectively tapered and squared.

8. A magnetic torpedo level, comprising:

a generally rectangular level body having a first side face, a second side face opposite said first side face defining a thickness therebetween, a base edge, a top edge opposite said base edge, opposed first and second ends, and a major length extending therebetween;

a plurality of longitudinally spaced apart magnets disposed across said base edge and integrated with said level body;

each of said magnets having a first pole disposed adjacent said first side face and a second pole disposed adjacent said second side face of said level body;

a first rail contacting said first pole of each of said magnets;

a second rail contacting said second pole of each of said magnets;

each said rail comprising a continuous length of ferrometallic material integrated with said level body and extending substantially along said major length of said level body;

each said rail further being parallel to one another, and depending from said base of said level body beyond said magnets and defining a channel therebetween for seating securely upon a cylindrical object;

at least one level vial frame disposed through said thickness of said level body; and a level vial disposed across said at least one level vial frame, visible from each of said side faces.

9. The magnetic torpedo level according to claim 8, wherein:

said at least one level vial frame is removably disposed through said thickness of said level body;

said at least one level vial frame further includes a plurality of sets of level vial sockets disposed therein; and each of said sets of level vial sockets comprises a first and a second level vial socket diametrically opposed to one another, for removably accepting said level vial therein and removably holding said level vial across said at least one level vial frame at a predetermined angular orientation relative to said level body according to the one of said sets of level vial sockets selected for removably installing said level vial therein.

10. The magnetic torpedo level according to claim 9, wherein said plurality of sets of level vial sockets of said at least one level vial frame define level vial orientations at 45 degrees, 22.5 degrees, parallel, and perpendicular to each said rail.

11. The magnetic torpedo level according to claim 9, further including a removable retaining plate for removably holding said at least one level vial frame within said level body.

12. The magnetic torpedo level according to claim 8, wherein said magnets comprise ceramic permanent magnets.

13. The magnetic torpedo level according to claim 8, wherein said level body is formed of material selected from the group consisting of plastic, aluminum, and wood.

14. The magnetic torpedo level according to claim 8, wherein said first and second ends of said level body are respectively tapered and squared.

15. A magnetic torpedo level, comprising:

a generally rectangular level body having a first side face, a second side face opposite said first side face defining a thickness therebetween, a base edge, a top edge opposite said base edge, opposed first and second ends, and a major length extending therebetween;

at least one level vial frame removably disposed through said thickness of said level body, the level vial frame having a periphery;

a level vial angularly adjustably disposed across said at least one level vial frame, visible from each of said side faces;

said at least one level vial frame further includes a plurality of sets of level vial sockets defined through the periphery of said frame; and each of said sets of level vial sockets comprises a first and a second level vial socket extending through diametrically opposed positions on the periphery of said level vial frame, for removably accepting said level vial therein and removably holding said level vial across said at least one level vial frame at a predetermined angular orientation relative to said level body according to the one of said sets of level vial sockets selected for removably installing said level vial therein.

16. The magnetic torpedo level according to claim 15, wherein said plurality of sets of level vial sockets of said at least one level vial frame define level vial orientations at 45 degrees, 22.5 degrees, parallel, and perpendicular to each said rail.

17. The magnetic torpedo level according to claim 15, further including a removable retaining plate for removably holding said at least one level vial frame within said level body.

18. The magnetic torpedo level according to claim 15, further including:
   a plurality of longitudinally spaced apart ceramic permanent magnets disposed across said base edge and integrated with said level body;
   each of said magnets having a first pole disposed adjacent said first side face and a second pole disposed adjacent said second side face of said level body;
   a first rail contacting said first pole of each of said magnets;
   a second rail contacting said second pole of each of said magnets;
   each said rail comprising a continuous length of ferrometallic material integrated with said level body and extending substantially along said major length of said level body; and
   each said rail further being parallel to one another, and depending from said base of said level body beyond said magnets and defining a channel therebetween for seating securely upon a cylindrical object.

19. The magnetic torpedo level according to claim 15, wherein said level body is formed of material selected from the group consisting of plastic, aluminum, and wood.

20. The magnetic torpedo level according to claim 15, wherein said first and second ends of said level body are respectively tapered and squared.

* * * * *